April 21, 1953  E. SCHOEBEL  2,635,886
GALLOPING HOBBYHORSE MOUNTED ON WHEELS
Filed Nov. 3, 1950
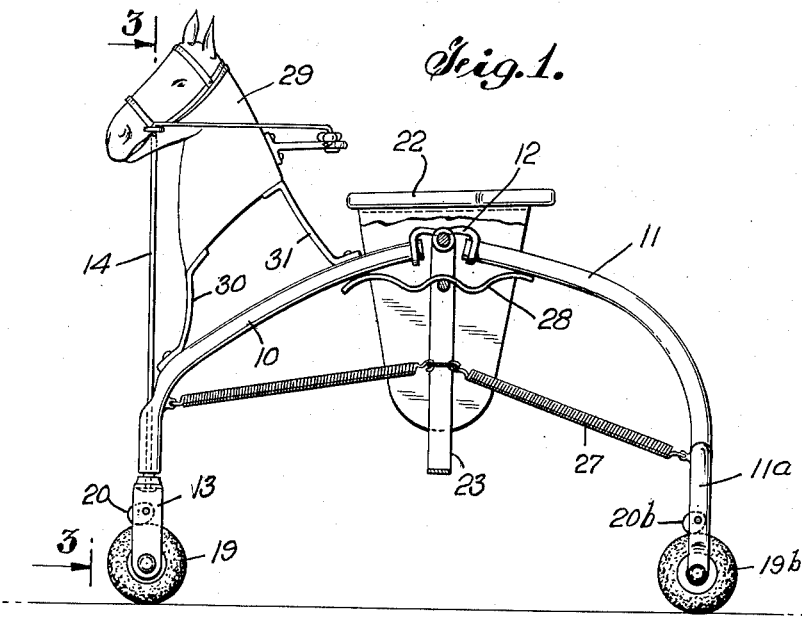
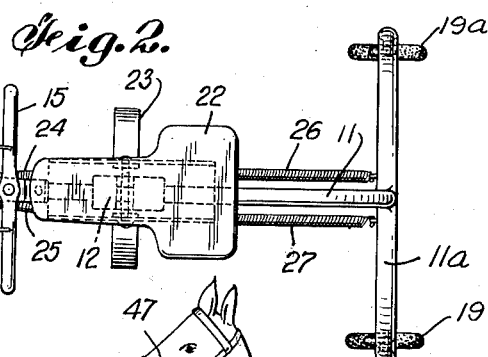
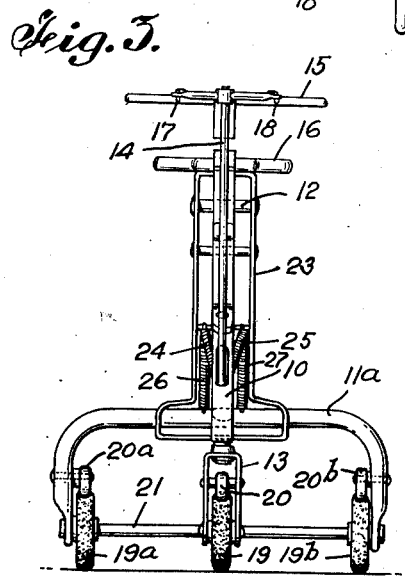
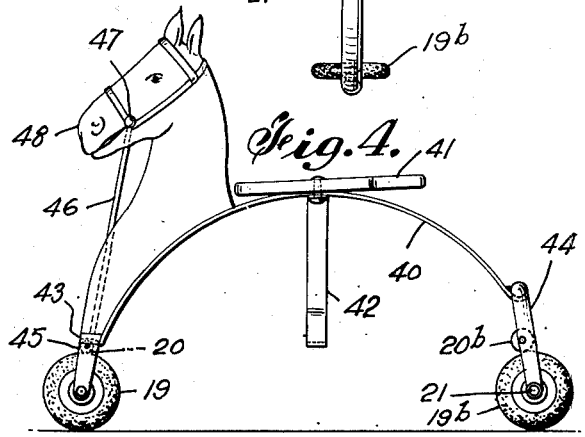
INVENTOR.
ELMER SCHOEBEL
BY Samuel J. Stoll
ATTORNEY Patented Apr. 21, 1953

2,635,886

UNITED STATES PATENT OFFICE 2,635,886

GALLOPING HOBBYHORSE MOUNTED ON WHEELS

Elmer Schoebel, Cambria Heights, N. Y.

Application November 3, 1950, Serial No. 193,782

5 Claims. (Cl. 280—1.183)

This invention relates to a galloping hobby horse mounted on wheels.

The principal object of this invention is the provision of a hobby horse which may be mounted by a child and which will simulate a forward galloping movement of an actual horse when the child bounces upon and with it. The hobby horse herein described and claimed is provided with front and rear portions which are mounted on wheels. The front and rear portions are movable toward and away from each other and tension means are provided to resist movement of said front and rear portions away from each other. When the child bounces downwardly upon the hobby horse, said front and rear portions are caused to move away from each other against the action of the tension means. When the horse is relieved of the weight of the child, as when the child bounces upwardly, the tension means will pull the front and rear portions of the horse toward each other. Locking means are provided to prevent the wheels on which the hobby horse is mounted from turning backwardly. The wheels, however, are free to rotate forwardly. Hence when the child bounces downwardly upon the horse and causes the front and rear portions to move away from each other, what actually happens is that the rear portion will move backwardly only to a very slight extent, that is until the locking means connected to the rear wheels take hold, and the forward or front portion of the horse will take a long stride, so to speak, forwardly. On the upward bouncing movement of the child, the tension means will tend to draw the front and rear portions of the hobby horse toward each other but what actually will happen is that the front portion will move backwardly only to the slight extent that the locking means on the front wheel will allow and the rear portion will take, in effect, a long stride forwardly. This process continues with the horse moving forwardly all the time in realistic simulation of the galloping movement of a living horse.

Galloping hobby horses of this general character have heretofore been devised and patented but there are important differences between the present invention and the galloping hobby horses of the prior art which make for very substantial advantages in construction and operation in the present design over the earlier designs. Most of the galloping hobby horses of the prior art cannot be steered by the rider since they have no steering gear. An important feature of the present invention is its steering gear which enables the rider to control and change its direction of movement at will at all times. The galloping hobby horses of the prior art are provided with ratchet mechanisms to prevent the wheels on which they are mounted from turning backwardly and to allow them to turn forwardly. Ratchet mechanisms for this purpose are wholly undesirable for two reasons, the first being that they are much too costly and the second being that they are much too noisy. The telltale clicking sounds of the ratchet mechanisms tend to detract from the realism of the performance of the hobby horse. Another disadvantage, particularly in the case of very young children, is the fact that ratchet mechanisms can be quite dangerous in that fingers may be caught in them and seriously injured.

In the present invention cam locks take the place of the ratchet mechanisms of the prior art. These cam locks operate upon the tires of the wheels in very effective, silent manner. There are no clicking sounds or any other detracting sounds or noises which would interfere with the otherwise realistic performance of the hobby horse. Furthermore, cam locks of the character herein described are much less expensive to make than the ratchet mechanisms of the prior art. They are fool proof in their operation and less likely than ratchet mechanisms to get out of order.

Another important feature of the present invention, reference being made particularly to the modified form thereof, is the use of a bowed leaf spring as the main frame of the hobby horse. In this form of the invention the tension means which tends to draw the front and rear portions of the hobby horse toward each other is the very frame which holds the front and rear portions together and on which the rider of the hobby horse sits.

It will be understood that the two forms of this invention which are shown in the drawing and described in the specification are but illustrative of the many forms which the invention may take within the broad scope of the appended claims.

The two preferred forms of the invention which are described in the specification are shown in the accompanying drawing in which:

Fig. 1 is a side view of a galloping hobby horse made in accordance with one preferred form of the invention.

Fig. 2 is a top view of said galloping hobby horse.

Fig. 3 is a front view of the same hobby horse.

Fig. 4 is a side view of a hobby horse made in accordance with the second preferred form of this invention.

Referring now to the first form of this invention and to Figs. 1, 2 and 3, it will be seen that the galloping hobby horse herein claimed comprises the following principal component parts: a front frame 10, a rear frame 11, a hinge 12 which connects said frames and renders them swingable toward and away from each other, a front fork 13 swively connected to the front frame, a steering rod 14 connected to said front fork, a steering handle 15 connected to said steering rod by means of a cross bar 16 which is fixed to said steering rod and a pair of reins or links 17 and 18, a front wheel 19 rotatably mounted in said front fork 13, a cam lock 20 swively connected to the fork for locking engagement with the tire of said front wheel, a rear axle 21 connected to the rear frame 11, a pair of rear wheels 19a and 19b mounted on said rear axle, a pair of locking cams 20a and 20b swively supported by the rear frame for locking engagement with the tires of said rear wheels, a seat 22 mounted on hinge 12, stirrups 23 supported by said hinge 12, a pair of tension members 24 and 25 connected at their forward ends to the front frame and at their rear ends to the stirrups, a second pair of tension members 26 and 27 connected at their forward ends to the stirrups and at their rear ends to the rear frame, a tension member 28 whose intermediate portion is connected to the stirrups and whose end portions engage the front and rear frames, and a horse's head 29 which is supported by means of brackets 30 and 31 on the front frame 10.

The front and rear frames of the hobby horse are bowed in shape as Fig. 1 clearly shows. Their adjacent ends are welded or otherwise fastened to the two straps of the hinge and it will be noted that the pintle of the hinge extends transversely of the hobby horse so as to allow the front and rear frames to swing toward and away from each other in forward and backward directions. Springs 24, 25, 26 and 27 act upon the front and rear frames to draw them together and to resist their movement away from each other. Spring 28 resiliently limits the movement of said front and rear frames toward each other beyond a given point. When the child who rides the hobby horse sits upon its seat, his weight tends to cause the front and rear frames to swing away from each other against the action of springs 24, 25, 26 and 27.

Cam locks 20, 20a and 20b may be identical with each other. They are simply disc or oval-shaped members pivotally mounted on off-center pivots. Their weight tends to swing them downwardly into continuous engagement with the tires of the wheels. When the wheels rotate forwardly, that is in the direction which produces a forward movement of the hobby horse, the cam locks merely rest upon the tires of the wheels and do not in any way interfere with such forward rotation. When however the wheels are turned backwardly, the cam locks tend to roll with the wheels until they lock the wheels against further backward rotation. When the wheels are once again turned forwardly, they tend to roll the cam locks out of their respective locking positions and thereafter the cam locks merely rest upon the wheels without causing any obstruction of their forward rotary movement.

The second form of this invention as shown in Fig. 4 differs from the first form in that its main frame comprises a bowed leaf spring 40. Seat 41 is mounted directly on said leaf spring and stirrups 42 are also supported directly by said leaf spring. When leaf spring 40 is used in the manner shown in Fig. 4, there is no need to incorporate springs 24, 25, 26, 27 and 28 into the hobby horse. Spring 40 provides all of the necessary tension in both directions, that is, to resist outward movement of the front and rear portions of the hobby horse away from each other and to prevent said front and rear portions from swinging toward each other beyond a given point. Attached to the front end of leaf spring 40 is the front frame 43 and attached to the back end of said leaf spring 40 is the rear frame 44. A front fork 45 is swively connected to the front frame 43 and a steering rod 46 having a handle 47 fastened to its upper end is attached to said front fork. Steering rod 46 may extend through the neck and head 48 of the hobby horse and said head and neck may or may not be part of the front frame of said hobby horse. A wheel 19 is rotatably mounted in the front fork and a cam lock 20 is swively mounted in said fork for locking engagement with the tire of said front wheel.

Rear frame 44 may be similar to the rearmost portion of rear frame 11 of the first form of the invention. It will be noted in Fig. 3 that the rear portion 11a of rear frame 11 has the general shape of an inverted U. Axle 21 is connected to the lower ends of the legs of said inverted U-shaped frame portion 11a. Cam locks 20a and 20b are swively mounted on said legs of said inverted U-shaped frame member. The same construction may be employed in connection with the second form of this invention as shown in Fig. 4. Frame 44 may be of inverted U-shape with its legs supporting axle 21 and cam locks 20a and 20b. Mounted on axle 21 are wheels 19a and 19b. Only cam lock 20b and wheel 19b are shown in Fig. 4 of the drawing.

The operation of the two galloping hobby horses above described is identical. The rider sits on the seat and places his feet in the stirrups. He holds the steering handle in his hands. He then effects a bouncing movement on the hobby horse and on the downward stroke he tends to move the front and rear portions of the horse away from each other and in opposition to the action either of spring 40 or springs 24, 25, 26 and 27, as the case may be. The cam locks prevent the wheels from turning backwardly and hence the rear portion of the horse remains substantially stationary and the front portion of the horse moves forwardly. On the upward stroke of the bounce, said springs tend to pull the front and rear portions of the hobby horse toward each other. The front portion remains substantially stationary since its cam lock prevents backward rotation of the front wheel and the rear portion moves forwardly. This action continues as long as the bouncing action endures.

I claim:

1. A galloping hobby horse of the character described, comprising a rear frame of inverted U-shape, an axle supported by the lower ends of the legs of said inverted U-shaped rear frame, a pair of wheels rotatably mounted on said axle, one adjacent each of said legs of the rear frame, a cam lock pivotally mounted on each of said legs of said rear frame immediately above the wheel adjacent each said leg, a main body frame secured at its lower end to the center portion of the yoke of said rear frame of inverted U-shape and projecting upwardly and forwardly, a hinge member secured to the forward end of said main body frame, a second main body frame, having a rear portion situated adjacent said hinge member, a second hinge member complementing the first hinge member and secured to said rear portion of the second main body frame, a transversely extending pintle joining the two hinge members so as to hingedly connect the two main body frames, a seat mounted on said pintle, stirrups secured to said pintle and seat and projecting downwardly therefrom, a fork, a steering rod projecting upwardly from said fork, a steering handle at the upper end of said steering rod, a bearing for said steering rod and fork provided at the forward end of the second main body frame, whereby said steering rod and fork are turnably secured to said second main body frame, an axle supported by said fork at its lower end, a wheel rotatably mounted on said axle, a cam lock pivotally supported by said fork immediately above said last mentioned wheel, all of said cam locks being situated and oriented relative to the wheels to which they are respectively adjacent so as to engage said wheels when they are turned rearwardly and to lock them against rearward turning movement, a tension spring connecting the stirrups with the rear end of the first main body frame, and a second tension spring connecting the stirrups with the forward end of the second main body frame, the action of said springs being to pull the two main body frames toward each other about the axis of the pintle and in opposition to the weight of a child sitting on said seat which would tend to spread said main body frames apart.

2. A galloping hobby horse in accordance with claim 1, wherein the cam locks comprise eccentrically mounted wheels which rest upon and frictionally engage the wheels of the hobby horse.

3. A galloping hobby horse in accordance with claim 1, wherein the cam locks comprise oval-shaped blocks which rest upon and frictionally engage the wheels of the hobby horse.

4. A galloping hobby horse in accordance with claim 1, wherein a leaf spring is attached intermediate its ends to the stirrups, one end of said spring bearing upwardly against the forward end of the first main body frame, the opposite end of said spring bearing upwardly against the rear end of the second main body frame, the action of said leaf spring being in opposition to the action of the two tension springs.

5. A galloping hobby horse in accordance with claim 1, wherein a simulated head of a horse is mounted on the second main body frame in front of the seat and stirrups, a bracket secured to the back of the horse's head, a second steering handle pivotally mounted on said bracket, and a pair of connecting rods situated on opposite sides of the pivot of the second handle and on opposite sides of the steering rod which supports the first handle, said connecting rods being pivotally connected at their respective ends to said first and second steering handles to enable a child mounted on said hobby horse to steer the same by means of said second handle.

ELMER SCHOEBEL.

References Cited in the file of this patent

UNITED STATES PATENTS

| Number | Name | Date |
|---|---|---|
| 1,553,219 | Crosby | Sept. 8, 1925 |
| 1,742,737 | Toth | Jan. 7, 1930 |
| 1,977,317 | Maypole | Oct. 16, 1934 |
| 2,017,213 | Laborda | Oct. 15, 1935 |
| 2,476,915 | Romero et al. | July 19, 1949 |

FOREIGN PATENTS

| Number | Country | Date |
|---|---|---|
| 218,011 | Great Britain | June 30, 1924 |
| 374,405 | Germany | Apr. 23, 1923 |
| 894,318 | France | Mar. 13, 1944 |